United States Patent Office 3,025,285
Patented Mar. 13, 1962

3,025,285
POLYMERIZATION PROCESS WITH ALKYL BORON CATALYSTS
Robert De Coene, Woluwe-St.-Lambert, Brussels, Belgium, assignor to Solvic Societe Anonyme, Brussels, Belgium, a Belgian company
No Drawing. Filed Mar. 31, 1959, Ser. No. 803,069
Claims priority, application Belgium Apr. 5, 1958
3 Claims. (Cl. 260—92.8)

The present invention concerns a new process of polymerization of vinyl chloride and the polymers obtained by this process wherein use is made of new and particularly active catalysts capable of permitting the polymerization of vinyl chloride at low temperatures, under atmospheric pressure.

The process forming the object of the invention consists in polymerizing vinyl chloride in the presence of a catalyst constituted by a boron derivative corresponding to the general formula $B_nR_mH_p$, wherein R represents an alkyl radical, $n$ is a whole number either equal to or above 2, $p$ is a whole number equal to or above 1 and $m+p=3n$.

Boranes or alkylated boranes may be used as catalysts, for example.

The quantity of catalyst to be used is of the order of 0.1 to 3% by weight of the quantity of the monomer to be polymerized. The polymerization of vinyl chloride according to the process of the invention may be carried out in bulk or in the presence of an inert organic medium. Depending on the temperature at which the polymerization is carried out, use is made of a vessel under atmospheric pressure or of an autoclave at a pressure higher than atmospheric pressure. The polymers obtained according to the present process stand out by a high degree of crystallinity rate and an improved heat resistance.

The invention is illustrated by the following example; it is, however, to be understood that it does not limit in any way the present invention which is capable of being widely varied without departing from its scope.

Example 500 g. of vinyl chloride and 1 liter of normal hexane are placed in an autoclave equipped with a stirrer, in the absence of air, the mixture being kept at a temperature of 0° C. 3 g. of dimethyl-diborane $[B_2H_4(CH_3)_2]$ are then introduced. The temperature is maintained at 0° C. with stirring during the entire polymerization. After 24 hours, 150 g. of polyvinyl chloride are obtained.

I claim:
1. A process for the polymerization of vinyl chloride which comprises effecting polymerization of vinyl chloride monomer in the presence of a sole catalyst constituted of an alkyl boron derivative of the formula $B_2H_4(CH_3)_2$.
2. A process as defined in claim 1, wherein the quantity of the catalyst is comprised between 0.1 and 3% by weight of the quantity of the vinyl chloride monomer to be polymerized.
3. A process as defined in claim 1, wherein polymerization is effected at a temperature below room temperature.

References Cited in the file of this patent
UNITED STATES PATENTS

| | | |
|---|---|---|
| 2,685,575 | Heiligmann et al. | Aug. 3, 1954 |
| 2,840,551 | Field et al. | June 24, 1958 |

OTHER REFERENCES

"Journal of Polymer Science," pp. 227 and 250 (1958). (Copy in Sci. Lib.)